United States Patent
Nishigori et al.

(10) Patent No.: US 9,332,426 B2
(45) Date of Patent: May 3, 2016

(54) COMMUNICATION SYSTEM, COMMUNICATION METHOD, AND COMMUNICATION PROGRAM

(75) Inventors: Yutaka Nishigori, Tokyo (JP); Takanori Iwai, Tokyo (JP)

(73) Assignee: NEC Corporation, Tokyo (JP)

( * ) Notice: Subject to any disclaimer, the term of this patent is extended or adjusted under 35 U.S.C. 154(b) by 34 days.

(21) Appl. No.: 14/343,930

(22) PCT Filed: Sep. 12, 2012

(86) PCT No.: PCT/JP2012/073293
§ 371 (c)(1),
(2), (4) Date: Mar. 10, 2014

(87) PCT Pub. No.: WO2013/047200
PCT Pub. Date: Apr. 4, 2013

(65) Prior Publication Data
US 2014/0226606 A1  Aug. 14, 2014

(30) Foreign Application Priority Data
Sep. 30, 2011  (JP) .................................. 2011-216103

(51) Int. Cl.
*H04W 4/00* (2009.01)
*H04W 8/26* (2009.01)
(Continued)

(52) U.S. Cl.
CPC ................ *H04W 8/26* (2013.01); *H04W 76/02* (2013.01); *H04W 76/041* (2013.01); *H04W 76/062* (2013.01)

(58) Field of Classification Search
CPC ............ H04W 76/022; H04W 76/041; H04W 76/062; H04W 8/26; H04W 76/02; H04W 76/042

USPC .......................................................... 370/329
See application file for complete search history.

(56) References Cited

U.S. PATENT DOCUMENTS

2005/0232146 A1* 10/2005 Lee et al. ...................... 370/225
2007/0165655 A1*  7/2007 Haumont ...................... 370/401
(Continued)

FOREIGN PATENT DOCUMENTS

| EP | 2 317 822 A1 | 5/2011 |
| JP | 2001-326697 A | 11/2001 |

(Continued)

OTHER PUBLICATIONS

3GPP TS 23.401, 3rd Generation Partnership Project; Technical Specification Group Services and System Aspects; General Packet Radio Service (GPRS) Enhancements for Evolved Universal Terrestrial Radio Access Network (E-UTRAN) Access (Release 10), Jun. 2011, V10.4.0, 281 pages.

(Continued)

*Primary Examiner* — Sai-Ming Chan
(74) *Attorney, Agent, or Firm* — Foley & Lardner LLP

(57) ABSTRACT

Provided is a communication system capable of releasing a tunnel while securing mobility without securing resources in an SGW or the like. A first node provided in a communication system that provides mobility of packet data using tunneling includes: a tunnel control unit that releases a tunnel and deletes tunnel information; and a management unit that associates and manages an IP address allocated to a terminal to which the tunnel is established and subscriber identification information of the terminal when the tunnel is released and the tunnel information is deleted.

20 Claims, 6 Drawing Sheets

(51) Int. Cl.
*H04W 76/02* (2009.01)
*H04W 76/04* (2009.01)
*H04W 76/06* (2009.01)

(56) References Cited

U.S. PATENT DOCUMENTS

2008/0320149 A1    12/2008    Faccin
2009/0213784 A1*    8/2009    Ang ............................. 370/328
2009/0232019 A1    9/2009    Gupta et al.

FOREIGN PATENT DOCUMENTS

| JP | 2001-326697 A | 11/2001 |
|---|---|---|
| JP | 2003-023420 A | 1/2003 |
| JP | 2003-23420 A | 1/2003 |
| JP | 2005-229447 A | 8/2005 |
| JP | 2005-229447 A | 8/2005 |
| JP | 2008-271140 A | 11/2008 |
| JP | 2008-271140 A | 11/2008 |
| JP | 2009-524275 A | 6/2009 |
| JP | 2009-524275 A | 6/2009 |

OTHER PUBLICATIONS

3GPP TS 25.401, $3^{rd}$ Generation Partnership Project; Technical Specification Group Radio Access Network; UTRAN Overall Description (Release 10), Jun. 2011, V10.2.0, 54 pages.

International Search Report, PCT/JP2012/073293, Nov. 13, 2012, 4 pages.

Extended European Search Report mailed Jun. 5, 2015 in related European appl. No. 12835955.1 (7 pgs.).

* cited by examiner

COMMUNICATION SYSTEM, COMMUNICATION METHOD, AND COMMUNICATION PROGRAM

This application is the National Phase of PCT/2012/073293, file Sep. 12, 2012, which claims priority to Japanese Application No. 2011-216103, filed Sep. 30, 2011 the disclosures of which are hereby incorporated by reference in their entirety.

TECHNICAL FIELD

The present invention relates to a communication system, a communication method, and a communication program.

BACKGROUND ART

In an EPC disclosed in, for example, Non-Patent Document 1, which is a standard related to an E-UTRAN (this term will be described later; the same applies to other terms throughout this paragraph), Always-On in which each GW maintains a tunnel is assumed. Thus, resources of a core network are necessary for the number of bearers to be established by a UE, which is a mobile terminal or the like. For this reason, the establishment of a tunnel and the assignment of an IP address are performed every time transmission from the UE is performed when the tunnel of the core network is released, and thus there is a possibility that the IP address issued to the UE is changed every time. In addition, it is impossible to notify the UE of reception when the tunnel of the core network is released.

In the above paragraph, E-UTRAN is an abbreviation for an evolved universal mobile telecommunications system (UMTS) terrestrial radio access network and represents one scheme of a radio access network. EPC is an abbreviation for an evolved packet core and is one scheme of a core network in which various radio access systems or the like are accommodated. GW is an abbreviation for a gateway and is a node which connects different types of networks. Here, a node is a logical representation of an apparatus on a network. UE is an abbreviation for user equipment, and represents a mobile terminal, a radio terminal, or the like. In addition, a tunnel refers to a virtual communication line implemented using encapsulation or the like. Always-On refers to a continuous Internet protocol (IP) connection. A core network refers to a portion which does not depend upon radio access in an overall network system. A bearer refers to a logical packet transfer path established between nodes.

On the other hand, in a UMTS terrestrial radio access network (UTRAN), which is another scheme of a radio access network described in, for example, Non-Patent Literature 2, a gateway general packet radio service (GPRS) support node (GGSN) manages UEs and IP addresses in a fixed manner, thereby making it possible to provide means for establishing a tunnel triggered by reception of a packet addressed to the IP address of a UE. However, there is a problem in that the UEs and the IP addresses are managed in a fixed manner, and thus the GGSN available to the UE is limited and it is necessary to set association information of the target UE and the IP address in the GGSN in advance.

PRIOR ART DOCUMENTS

Non-Patent Documents

Non-Patent Document 1: 3gpp Technical Specification TS 23.401 V10.4.0 (2011-06), "3rd Generation Partnership Project; Technical Specification Group Services and System Aspects; General Packet Radio Service (GPRS) enhancements for Evolved Universal Terrestrial Radio Access Network (E-UTRAN) access (Release 10)"

Non-Patent Document 2: 3gpp Technical Specification TS 25.401 V10.2.0 (2011-06), "3rd Generation Partnership Project; Technical Specification Group Radio Access Network; UTRAN overall description (Release 10)"

SUMMARY OF THE INVENTION

Problems to be Solved by the Invention

In a network system using the above-described E-UTRAN or UTRAN, it is necessary to set a tunnel for providing mobility for each UE and maintain the tunnel for reception. For this reason, it is necessary to install many network facilities. In addition, because a state in which resources of a serving gateway (SGW) are secured is assumed even when an S1 bearer in which communication is not in progress is released, there is a problem in that it is impossible to recover the bearer at the time of SGW failure. Here, SGW is a GW which accommodates various radio access networks such as the E-UTRAN and performs data transfer with the core network. In addition, the S1 bearer refers to, for example, a bearer between the E-UTRAN and the SGW.

An exemplary object of the present invention is to provide a communication system, a communication method, and a communication program capable of solving the above-described problems.

Means for Solving the Problems

In order to solve the above problems, a first node of the present invention is provided in a communication system that provides mobility of packet data using tunneling, and includes: a tunnel control unit that releases a tunnel and deletes tunnel information: and a management unit that associates and manages an IP address allocated to a terminal to which the tunnel is established and subscriber identification information of the terminal when the tunnel is released and the tunnel information is deleted.

Moreover, a communication method of the present invention is a communication method for providing mobility of packet data using tunneling, and the communication method includes: releasing, by a first node, a tunnel and deleting tunnel information; and associating and managing, by the first node, an IP address allocated to a terminal to which the tunnel is established and subscriber identification information of the terminal when the tunnel is released and the tunnel information is deleted.

Furthermore, a communication program of the present invention is a communication program that provides mobility of packet data using tunneling and causes a computer of a first node to execute: a step of releasing a tunnel and deleting tunnel information: and a step of associating and managing an IP address allocated to a terminal to which the tunnel is established and subscriber identification information of the terminal when the tunnel is released and the tunnel information is deleted.

Exemplary Advantages of the Invention

The present invention can release a tunnel while securing mobility without securing resources in, for example, an SGW.

MODES FOR CARRYING OUT THE INVENTION

Figure 1:
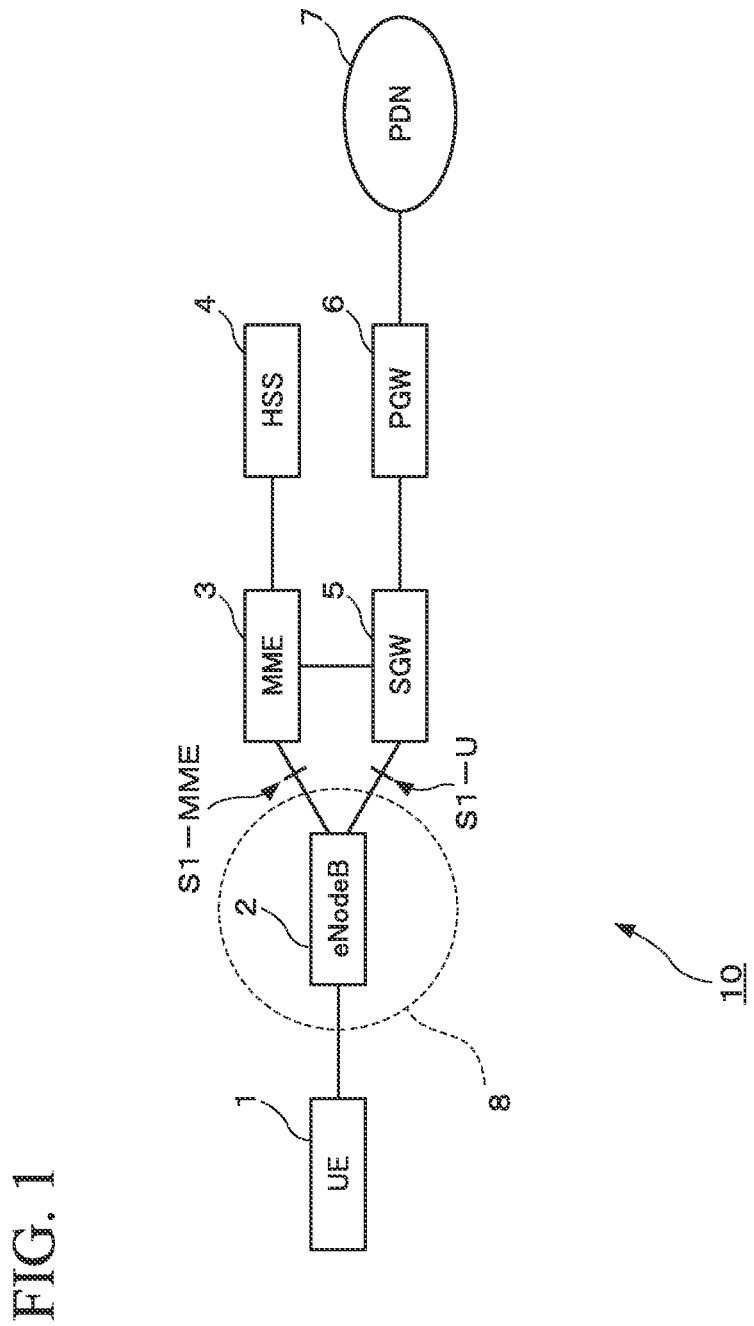
FIG. 1 is a network configuration diagram describing a communication system as an exemplary embodiment of the present invention.

Hereinafter, an exemplary embodiment of a communication system in accordance with the present invention will be described with reference to drawings. FIG. 1 illustrates a network configuration diagram representing a communication system 10 serving as the exemplary embodiment of the present invention. The communication system 10 illustrated in FIG. 1 is a communication system which provides mobility of packet data using tunneling, and is configured to include a UE 1, an E-UTRAN Node B (eNodeB) (also referred to as an eNB) 2, a mobility management entity (MME) 3, a home subscriber server (HSS) 4, an SGW 5, a packet data network (PDN) gateway (PGW) 6, and a PDN 7.

It is to be noted that the communication system 10 normally includes a plurality of structural elements (i.e., nodes). In addition, the communication system 10 also includes, for example, a domain name system (DNS) (not illustrated) to be used when, for example, the PGW 6 or the like inquires about, for example, an IP address of the MME 3, and a node of a policy and charging rules function (PCRF) which performs quality of service (QoS) control, charging control, and the like. In addition, an E-UTRAN 8 is configured by including the eNodeB 2 illustrated in FIG. 1 and a plurality of eNodeBs (not illustrated). Furthermore, a reference point S1-MME between the E-UTRAN 8 and the MME 3 is defined, and a reference point S1-U between the E-UTRAN 8 and the SGW 5 is defined. In addition, a link passing through the reference point S1-MME is used as a control signal interface, and a link passing through the reference point S1-U is used as a data transfer interface and a control signal interface. In addition, in the communication system 10, a core network which does not depend upon radio access is configured using the SGW 5, the PGW 6, and the like.

In FIG. 1, the UE 1 is a mobile terminal which supports the E-UTRAN 8.

The eNodeB 2 is a node such as a radio base station which manages a radio connection, and establishes a tunnel of each bearer with the SGW 5 every time the establishment of the radio connection with the UE 1 is performed. In addition, the eNodeB 2 releases the tunnel with the SGW 5 with the release of the radio connection as a trigger.

The MME 3 is a node which performs authentication and mobility management of the UE 1. The MME 3 registers the location of the UE 1 with the HSS 4 when newly accommodating the UE 1. As a result the HSS 4 can identify the MME 3 which accommodates the UE 1. That is, in the present exemplary embodiment, the MME 3 holds attach information (i.e., registration information) of the UE 1, and manages the UE 1 in accordance with $3^{rd}$ Generation Partnership Project (3gpp) standard rules (see, for example, Non-Patent Document 1). In addition, the MME 3 also holds the IP address of the UE 1 and information (hereinafter referred to as PGW information) about a selected PGW 6, for example, predetermined for each UE 1, in accordance with the 3gpp standard rules.

The HSS 4 is a node which provides a database for managing subscriber data and holds information of each MME 3 which manages and accommodates each UE 1 and manages agreement information of each UE 1 or the like in accordance with the 3gpp standard rules.

The SGW 5 is a node which ensures the arrival of an IP packet for the UE 1 by holding the tunnel between the SGW 5 and the PGW 6 and with a radio apparatus such as the UE 1 in units of bearers.

The PGW 6 is a node serving as an anchor point which provides mobility of the UE 1 for the PDN 7, issues an IP address for the UE 1, and forwards an IP packet addressed to the UE 1 to the tunnel established with the SGW 5. In addition, the PGW 6 has a storage apparatus storing information (i.e., a correspondence table of the IP address of the UE 1 and subscriber identification information) in which the IP address is associated with the subscriber identification information such as an international mobile subscriber identity (IMSI) (unique identification information allocated to a communication terminal such as a portable phone or an integrated circuit (IC) card for the communication terminal) or a mobile station international subscriber directory number (MSISDN) of the UE 1 to which the IP address is allocated. In addition, the PGW 6 of the present exemplary embodiment dynamically selects and issues the IP address for the UE 1 at the time of initial attach/bearer establishment of the UE 1 and holds the association between the UE 1 and the IP address as the above-described association information. Therefore, it is unnecessary to register the IP address of the UE 1 in advance.

The PDN 7 is an IP-based packet network such as an IP multimedia subsystem (IMS).

Because the tunnel between the SGW 5 and the PGW 6 is continuously maintained in the 3gpp standard rules, the PGW 6 holds the IP address issued to the UE 1, the subscriber identification information such as the IMSI or the MSISDN of the UE 1, and tunnel information (i.e., data and resources to be used for establishing and maintaining the tunnel) between the PGW 6 and the SGW 5. However, in the present exemplary embodiment, the PGW 6 holds the information in which the IP address is associated with the subscriber identification information such as the IMSI or the MSISDN of the UE 1 and thus can release the tunnel between the PGW 6 and the SGW 5. That is, in the present exemplary embodiment, when the tunnel is released, the PGW 6 holds only the information in which the IP address is associated with the subscriber identification information such as the IMSI or the MSISDN of the UE 1 without holding the tunnel information between the PGW 6 and the SGW 5.

In addition, because the PGW 6 holds the association information (i.e., the correspondence table) of the IP address and the subscriber identification information such as the IMSI or the MSISDN of the UE 1, the SGW 5 can release not only the tunnel related to the UE 1 but also all information including the IP address, the subscriber identification information, and the like related to the UE 1.

In the present exemplary embodiment, as described above, when the tunnel between the PGW 6 and the SGW 5 is released, the PGW 6 holds the association information of the IP address and the subscriber identification information such as the IMSI or the MSISDN of the UE 1. In addition, the MME 3 holds the IP address of the accommodated UE 1 and the PGW information in accordance with the 3gpp standard rules. Therefore, for example, when the MME 3 receives the transmission from the UE 1, that is, a Service Request for an S1 recovery via the eNodeB 2, it is possible to recover the tunnel between the SGW 5 and the PGW 6 using the association information of the IP address and the subscriber identification information of the UE 1 held by the PGW 6 represented by the PGW information by performing a bearer establishment process using the IP address of each UE 1 and the PGW information held by the MME 3. It is to be noted that although only one SGW 5 is illustrated in FIG. 1, the SGW 5 to be used during the tunnel recovery may not necessarily be the same as the SGW 5 used before the tunnel release.

In addition, when the tunnel between the PGW 6 and the SGW 5 has already been released and when a reception packet addressed to the UE 1 reaches the PGW 6 from the PDN 7, the PGW 6 can provide a reception notification to the MME 3 by deriving subscriber identification information such as the IMSI from the IP address to which the reception packet is addressed based on association information between the IP address and the subscriber identification information such as the IMSI or the MSISDN of the UE 1, which is held by the PGW 6 itself and inquiring the HSS 4 about the MME 3 accommodating the UE 1 using the derived subscriber identification information. At this time, it is possible to perform a bearer establishment process using the IP address of each UE 1 and the PGW information held by the MME 3. That is, at this time, the tunnel recovery triggered by the S1 recovery is possible as in the transmission from the UE 1.

In this manner, in the communication system 10 of the present exemplary embodiment, only the association information of the IP address dynamically issued by the PGW 6 and the subscriber identification information such as the IMSI or the MSISDN of the UE 1 is stored, and the transmission from the UE 1 and the reception for the UE 1 are possible when the tunnel between the SGW 5 and the PGW 6 and the association information are released or deleted. Consequently, it is possible to minimize necessary resources of a core network including the PGW 6, the SGW 5, and the like and effectively utilize the resources.

Next, an example of an operation of the communication system 10 described with reference to FIG. 1 will be described with reference to FIGS. 2 to 5. It is to be noted that because attach (a registration process for a network) and bearer establishment operations of the UE 1 follow the 3gpp standard rules, a description thereof is omitted. The attach process follows item 5.3.2 "Attach procedure" of 3gpp TS 23.401 (Non-Patent Document 1).

Figure 2:
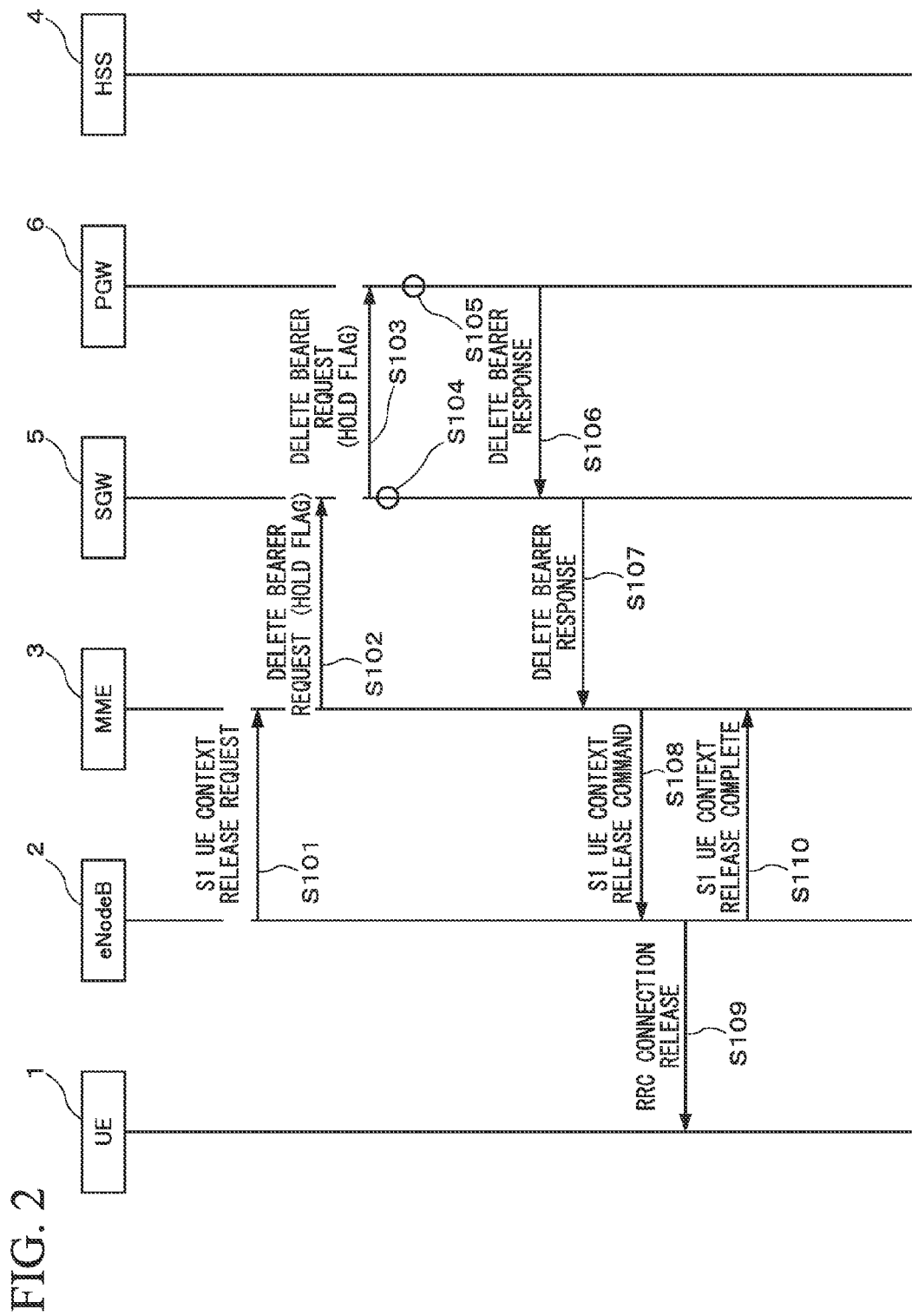
FIG. 2 is a sequence diagram describing an operation when radio resources are released after a bearer has been established in the communication system of FIG. 1.

First, an operation when the radio resource is released after bearer establishment under the assumption that the bearer establishment operation in accordance with the 3gpp standard rules has already been performed for a certain UE 1 will be described using FIG. 2. Here, the operation when the radio resource is released is based on an operation of item 5.3.5 "S1 release procedure" of 3gpp TS 23.401.

For example, with initiation of a radio resource release process with the UE 1 triggered by any of various reasons provided as examples in the 3gpp standard rules, such as that the UE 1 is not used for a predetermined time or more, the eNodeB 2 transmits an S1 UE Context Release Request message (hereinafter, the word "message" will be omitted) to the MME 3 (S101). It is to be noted that the context refers to information used in a communication path and communication control. In an operation in accordance with the 3gpp standard rules, the MME 3 receiving the S1 UE Context Release Request performs only tunnel release between the SGW 5 and the eNodeB 2 by transmitting a Release Access Bearers Request to the SGW 5. In the present exemplary embodiment, unlike the 3gpp standard rules, a Delete Bearer Request is transmitted from the MME 3 to the SGW 5 (S102). At this time, in order to notify the SGW 5 and the PGW 6 of the tunnel release process triggered by the radio resource release, the MME 3 sets a "Hold flag" which is a flag newly adopted in the present exemplary embodiment in the Delete Bearer Request.

The SGW 5 receiving the Delete Bearer Request to which the Hold flag is attached transmits the Delete Bearer Request to which the Hold flag is attached to the PGW 6 (S103), and then performs the tunnel release process and the resource release process related to the UE 1 (S104).

The PGW 6 receiving the Delete Bearer Request to which the Hold flag is attached holds only association information of the IP address of the UE 1 and the subscriber identification information (hereinafter referred to as an IMSI) such as the IMSI, and executes the tunnel release with the SGW 5 and other resource release (S105).

As a result of the above-described process, the SGW 5 and the PGW 6 release all the tunnels with the UE 1, the SGW 5 releases all the resources related to the UE 1, and the PGW 6 holds only the correspondence between the IP address of the UE 1 and the IMSI. It is to be noted that when the PCRF is used, the resources of the PCRF are also released along with the release processes of the SGW 5 and the PGW 6. In addition, as described above, the MME 3 holds the IP address of the accommodated UE 1 and the PGW information in accordance with the 3gpp standard rules even after the tunnel release.

Thereafter, in accordance with the 3gpp standard rules, a Delete Bearer Response is transmitted from the PGW 6 to the SGW 5 (S106). Then, the Delete Bearer Response is transmitted from the SGW 5 to the MME 3 (S107). Next, an S1 UE context release command is transmitted from the MME 3 to the eNodeB 2 (S108). Here, when a radio resource control (RRC) connection is not released, the eNodeB 2 transmits an RRC Connection Release to the UE 1 (S109). Upon receiving an acknowledgement (ACK) from the UE 1, the eNodeB 2 deletes the context of the UE 1 and transmits an S1 UE Context Release Complete to the MME 3 (S110).

Figure 3:
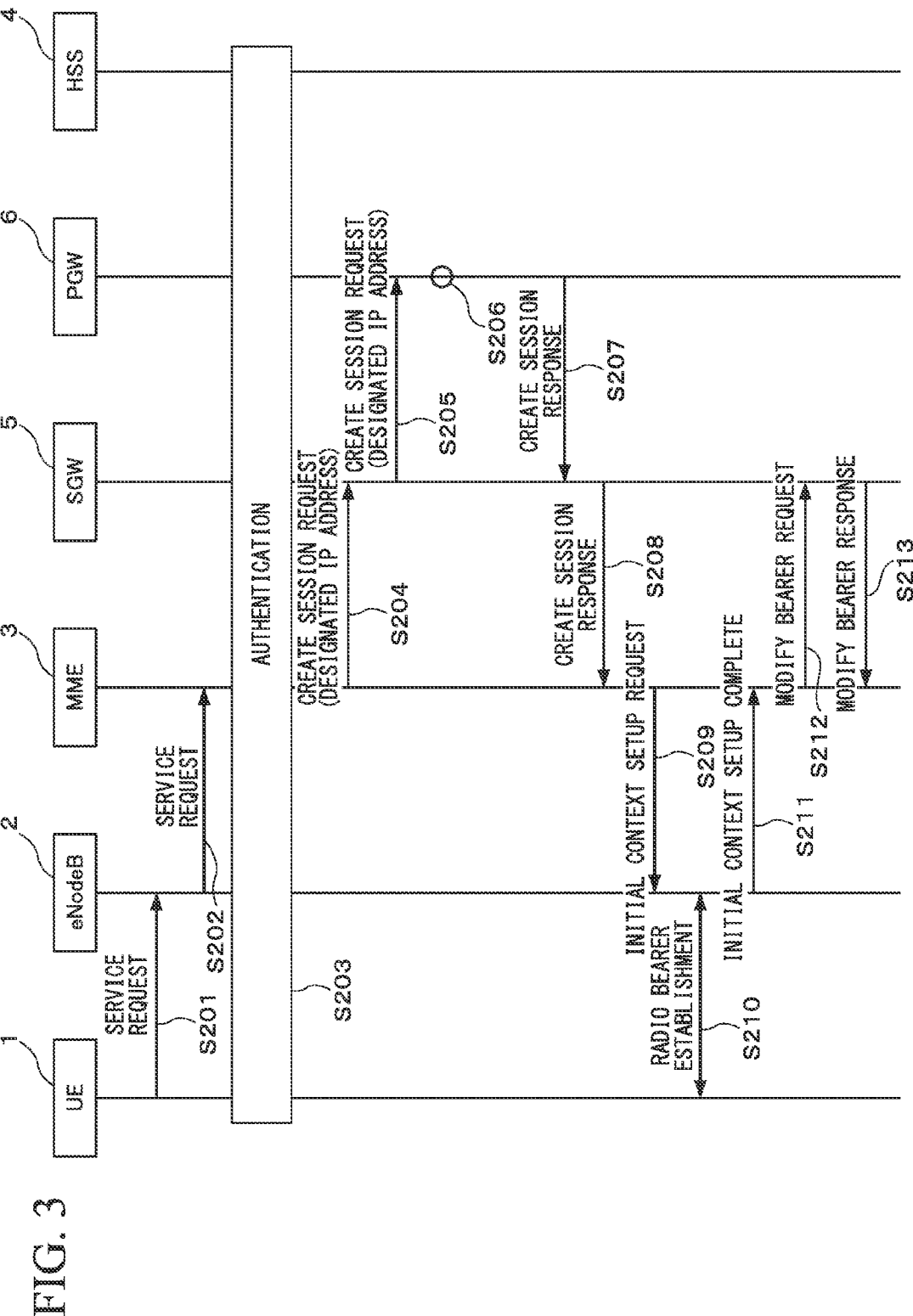
FIG. 3 is a sequence diagram describing an operation of a bearer recovery process initiated by a UE in the communication system of FIG. 1.

Next, the operation in the bearer recovery process initiated by the UE 1 will be described using FIG. 3. This operation is based on an operation of Item 5.3.4.1 "UE triggered Service Request" of 3gpp TS 23.401.

When the MME 3 receives a Service Request from the UE 1 via the eNodeB 2 (S201 and S202), a process of authenticating the UE 1 is executed among the UE 1, the MME 3, and the HSS 4 (S203). Here, in the bearer recovery operation of the 3gpp standard rules, related tunnel resources remain in the SGW 5 and the PGW 6 after the authentication process in S203, and thus S204 to S208 of FIG. 3 are skipped, and an Initial Context Setup Request (S209) is issued. Then, after Radio Bearer Establishment (S210) and initial context setup completion (S211), a Modify Bearer Request is transmitted from the MME 3 to the SGW 5 (S212). With these processes, it is possible to perform the bearer recovery process initiated by the UE 1 by only handing over tunnel information of the eNodeB 2 to the SGW 5.

In contrast, in the present exemplary embodiment, because the SGW 5 and the PGW 6 have already released the resources, a Create Session Request is transmitted from the MME 3 to the SGW 5 and a tunnel establishment process is newly performed (S204). At this time, in order to issue the same IP address as that of the tunnel deleted in the radio resource release process described with reference to FIG. 2 to the UE 1, the MME 3 sets the IP address issued to the UE 1 during first (or previous) bearer establishment as designated IP address information in the Create Session Request. It is to be noted that as in the process of the 3gpp standard rules when the Create Session Request is transmitted, the IMSI is set as UE information in the Create Session Request to be transmitted by the MME 3 in S204 (and by the SGW 5 in the next S205).

The SGW 5 receiving the Create Session Request from the MME 3 performs the tunnel establishment process and transmits the Create Session Request to which the IP address is attached to the PGW 6 (S205). The PGW 6 checks whether the designated IP address and the IMSI set in the received signal are the same as the IP address and the IMSI in the correspondence table, which is held by the PGW 6 itself, and if both are the same, determines the tunnel recovery process and performs the tunnel establishment process using the IP address designated in the signal again (S206). Thereafter, the PGW 6 transmits a Create Session Response for the Create Session Request of S205 (S207).

The SGW 5 receiving the Create Session Response from the PGW 6 transmits the Create Session Response to the MME 3 (S208). The MME 3 receiving the Create Session Response from the SGW 5 in S208 transmits an Initial Context Setup Request to the eNodeB 2 in accordance with the 3gpp standard rules (S209). Thereafter, in accordance with the 3gpp standard rules, first, the eNodeB 2 performs a radio bearer establishment process with the UE 1 (S210). Next, the eNodeB 2 transmits an Initial Context Setup Complete to the MME 3 (S211). Next, the MME 3 transmits a Modify Bearer Request to the SGW 5 (S212), and the SGW 5 transmits a Modify Bearer Response to the MME 3 (S213).

It is to be noted that when the PCRF is used, resources of the PCRF are also recovered along with the tunnel recovery process of the SGW 5 and the PGW 6.

Figure 4:
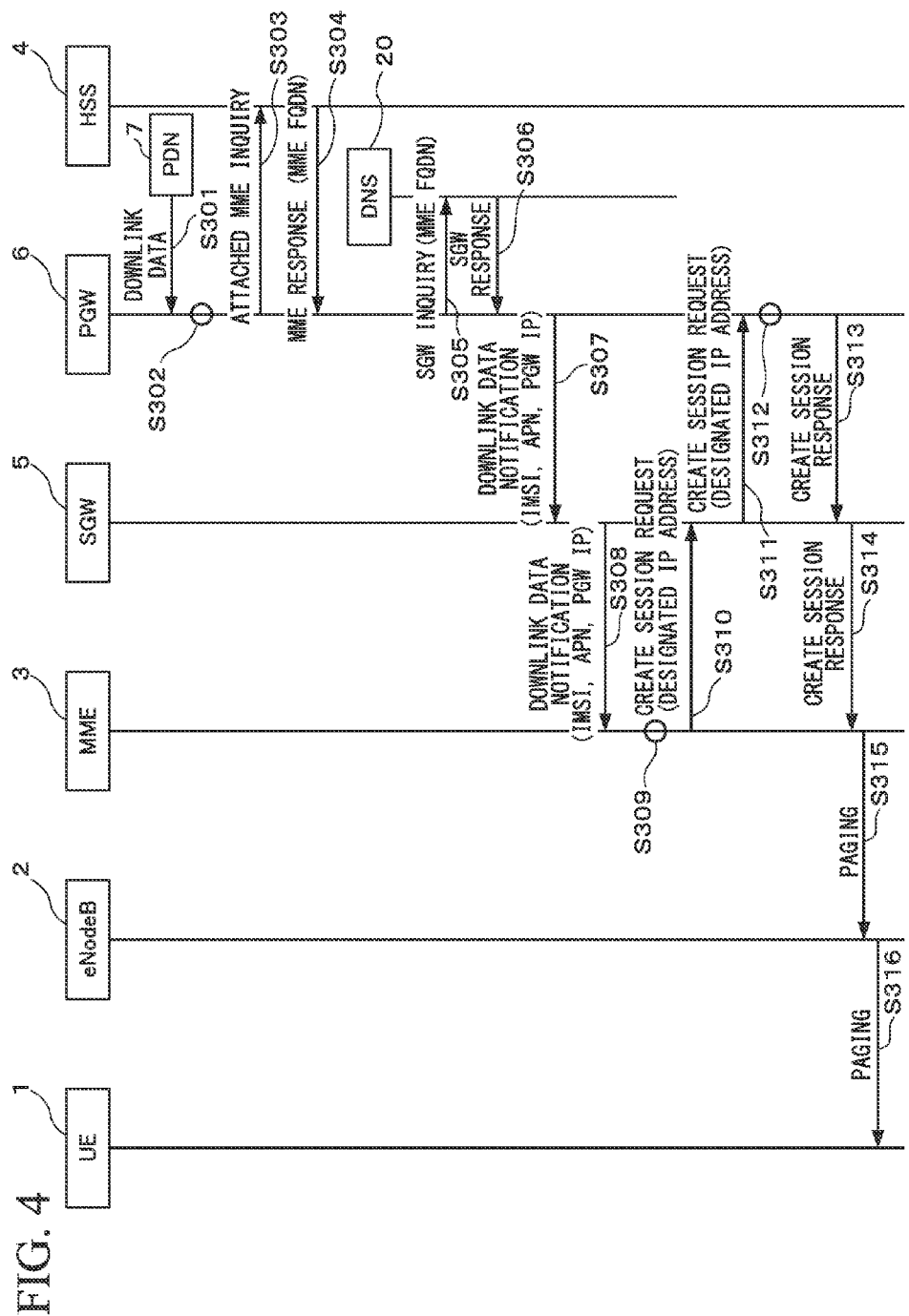
FIG. 4 is a sequence diagram describing a tunnel recovery process triggered by reception of an IP packet addressed to a UE in the communication system of FIG. 1.

Next, the tunnel recovery process triggered by the reception of an IP packet addressed to the UE 1 will be described using FIG. 4. This operation is based on Item 5.3.4.3 "Network Triggered Service Request" of 3gpp TS 23.401. It is to be noted that because the tunnel between the PGW 6 and the SGW 5 is still maintained in accordance with the operation of the 3gpp standard rules, the IP packet addressed to the UE 1 reaches the SGW 5 by using the maintained tunnel and the SGW 5 transmits an IP packet reception notification to the MME 3. In contrast, in the present exemplary embodiment, because the SGW 5 and the PGW 6 have already released the resources, the PGW 6 receiving the IP packet (downlink data) addressed to the UE 1 from the PDN 7 (S301) extracts the destination IMSI of the IP packet by referring to the correspondence table of the IP address and the IMSI (S302), Thereafter, the PGW 6 inquires the HSS 4 about the MME 3 which accommodates the UE 1 using the IMSI as a key (S303) and receives a fully qualified domain name (FQDN) of the MME 3 from the HSS 4 (S304). Thereafter, the PGW 6 inquires a predetermined DNS 20 about an IP address of the SGW 5 using the FQDN of the MME 3 (S305). After the PGW 6 has obtained the IP address of the SGW 5 from the DNS 20 (S306), the PGW 6 additionally sets, in a Downlink Data Notification, the IMSI, an access point name (APN), and a PGW address (i.e., an IP address of the PGW 6) so as to specify a target bearer as well as the IP address defined in the current 3gpp standard rules and performs transmission (S307). The SGW 5 receiving the Downlink Data Notification from the PGW 6 transmits to the MME 3 the Downlink Data Notification which includes additional setting of the IMSI, the APN, and the PGW address to the 3gpp standard rules (S308).

The MME 3 receiving the Downlink Data Notification from the SGW 5 selects the SGW 5 to be connected based on the APN, the PGW address, and the like (S309). The SGW 5 at this time may not be the SGW 5 used during initial (or previous) bearer establishment. Next, as in the process of S204 of the bearer recovery process initiated by the UE 1 described with reference to FIG. 3, the MME 3 transmits a Create Session Request in which the IP address initially (or previously) issued to the UE 1 is set as designated IP address information (S310). Thereafter, as in S205 to S208 of FIG. 3, the SGW 5 receiving the Create Session Request from the MME 3 performs the tunnel establishment process and transmits the Create Session Request to which the IP address is attached to the PGW 6 (S311). The PGW 6 checks whether the designated IP address and the IMSI set in the received signal are the same as the IP address and the IMSI in the correspondence table, which is held by the PGW 6 itself, if both are the same, determines the tunnel recovery process and performs the tunnel establishment process using the IP address designated in the signal again (S312). Thereafter, the PGW 6 transmits a Create Session Response for the Create Session Request of S311 (S313). The SGW 5 receiving the Create Session Response from the PGW 6 transmits the Create Session Response to the MME 3 (S314).

Next, the MME 3 receiving the Create Session Response from the SGW 5 transmits Paging (i.e., a signal which pages the UE 1 of a standby state) toward the registered UE 1 via the eNodeB 2 after the tunnel recovery (S315 and S316). The paging here follows the 3gpp standard rules.

As described above, in the present exemplary embodiment, with a state in which the attached and hearer established UE 1 has released S1 as a trigger, that is, with a state in which the UE 1 has released connections passing through the reference points S1-U and S1-MME as a trigger, the tunnel between the SGW 5 and the PGW 6 is released and related resources are released and deleted. As a result, it is possible to save resources of a core network compared to the number of accommodated UEs 1.

That is, in the present exemplary embodiment, when the tunnel is released and the tunnel information is deleted in the network which provides mobility of packet data using tunneling, it is possible to effectively utilize resources of the core network by dynamically associating and managing an IP address and a subscriber ID (subscriber identification information).

In addition, in order to enable Always-On, that is, transmission/reception, the MME 3 performs the tunnel establishment designating the IP address and the PGW before the tunnel release during S1 recovery from the UE 1. Upon receiving a packet addressed to the UE 1, the PGW 6 holds only association information of the IP address and the UE 1 and cooperates with the HSS 4, and thus it is possible to transmit a reception notification to the MME 3 which accommodates the UE 1 and perform the tunnel establishment triggered by packet reception. As a result, even in a state in which the tunnel release is performed, it is possible to realize Always-On as in the 3gpp standard rules.

In addition, the PGW 6 is dynamically selected during the initial attach/bearer establishment, the PGW 6 dynamically issues an IP address, and the association of the UE 1 and the IP address is held. Accordingly, it is possible to make a fixed IP address unnecessary, the UE 1 can select an optimum PGW 6 every time a bearer is newly established, and a procedure of setting association information of the UE 1 and the IP address in advance is also unnecessary.

As described above, the present exemplary embodiment provides exemplary advantages as described below.

As a first exemplary advantage, it is possible to improve the efficiency of resources of the SGW 5 and the PGW 6 because the SGW 5 and the PGW 6 can release the tunnel without affecting transmission to and reception from the UE 1.

As a second exemplary advantage, there is no influence due to a failure of the SGW 5 during S1 release because the SGW 5 is selected again and the tunnel is recovered every time S1 is recovered.

Figure 5:
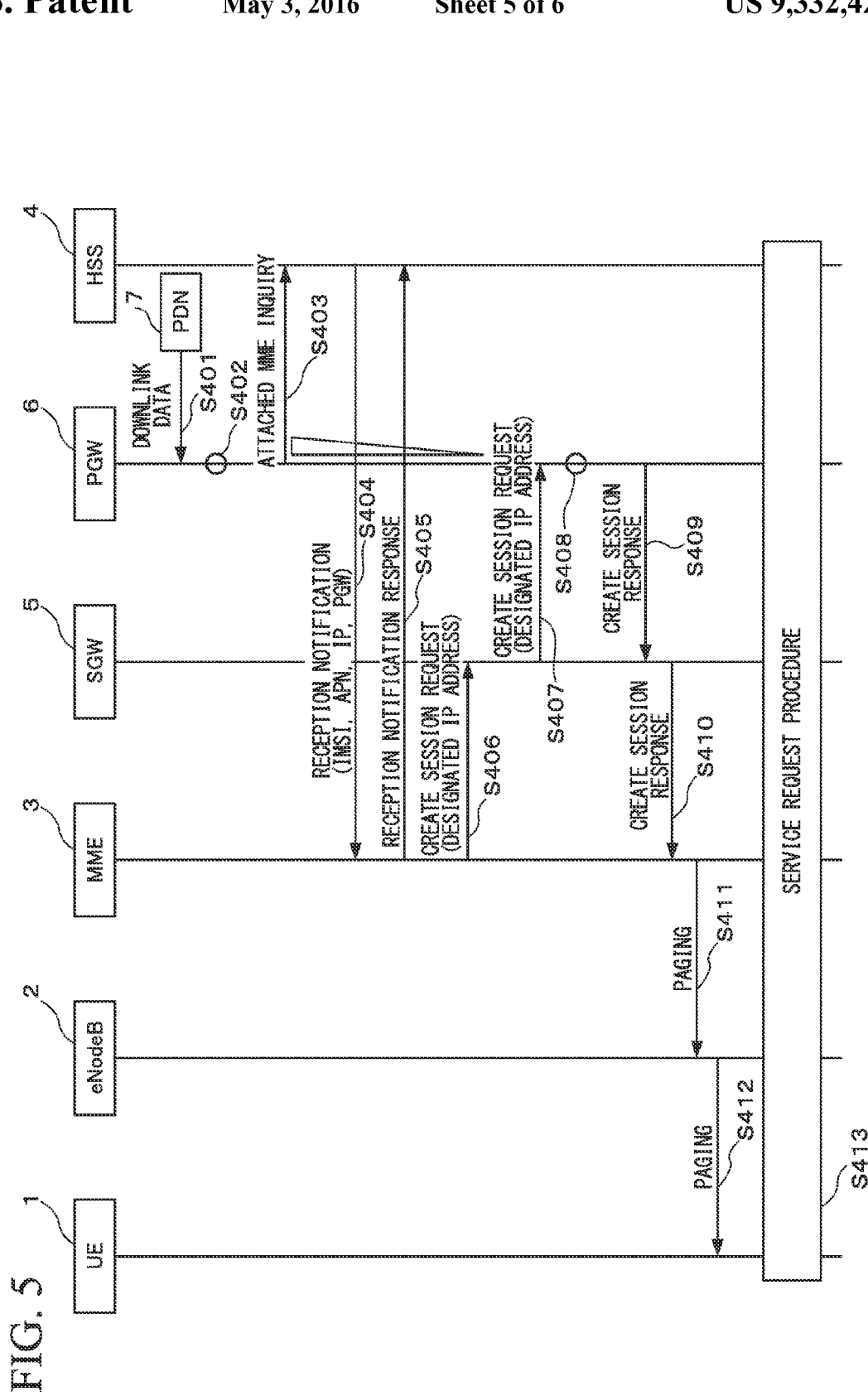
FIG. 5 is a sequence diagram describing another example of the tunnel recovery process triggered by the reception of the IP packet addressed to the UE in the communication system of FIG. 1.

Next, another exemplary embodiment of the present invention will be described with reference to FIG. 5. Although the basic configuration of the present exemplary embodiment is as illustrated in FIG. 1 as in the above-described exemplary embodiment an operation in the tunnel recovery process triggered by reception of an IP packet addressed to the UE 1 is different. Another technique of the tunnel recovery process triggered by the reception of the IP packet addressed to the UE 1 in the present exemplary embodiment will be described using FIG. 5. The exemplary advantages obtained from the present exemplary embodiment are the same as those of the above-described exemplary embodiment.

The PGW 6 receiving downlink data addressed to the UE 1 from the PDN 7 (S401) extracts a destination IMSI of the downlink data from the correspondence table of the IP address and the IMSI, which is held by the PGW 6 itself (S402). Thereafter, the PGW 6 inquires the HSS 4 about the attached MME 3 (S403).

The HSS 4 receiving the inquiry about the attached MME 3 transmits a Reception Notification to the MME 3 accommodating the UE 1 (S404). At this time, in order for the MME 3 to determine the bearer, the HSS 4 attaches information about an IMSI, an APN, an IP address, and a PGW address to the Reception Notification. The MME 3 receiving the Reception Notification transmits a Reception Notification Response to the HSS 4 (S405). Thereafter, as in S310 to S316 of FIG. 4, the MME 3 transmits a Create Session Request in which the IP address initially (or previously) issued to the UE 1 is set as designated IP address Information to the SGW 5 (S406). Next, the SGW 5 receiving the Create Session Request from the MME 3 performs a tunnel establishment process and transmits the Create Session Request to which the IP address is attached to the PGW 6 (S408). The PGW 6 checks whether the designated IP address and the IMSI set in the received signal are the same as the IP address and the IMSI in the correspondence table, which is held by the PGW 6 itself, if both are the same, determines the tunnel recovery process and performs the tunnel establishment process using the IP address designated in the signal again (S408). Thereafter, the PGW 6 transmits a Create Session Response for the Create Session Request of S407 (S409). The SGW 5 receiving the Create Session Response from the PGW 6 transmits the Create Session Response to the MME 3 (S410).

Next, the MME 3 receiving the Create Session Response from the SGW 5 transmits Paging (i.e., a signal which pages the UE 1 in a standby state) toward the registered UE 1 via the eNodeB 2 after the tunnel recovery (S411 and S412). The paging here follows the 3gpp standard rules.

When the UE 1 receives the Paging (S412), thereafter a Service Request Procedure initiated by the UE 1 is performed (S413).

Figure 6:
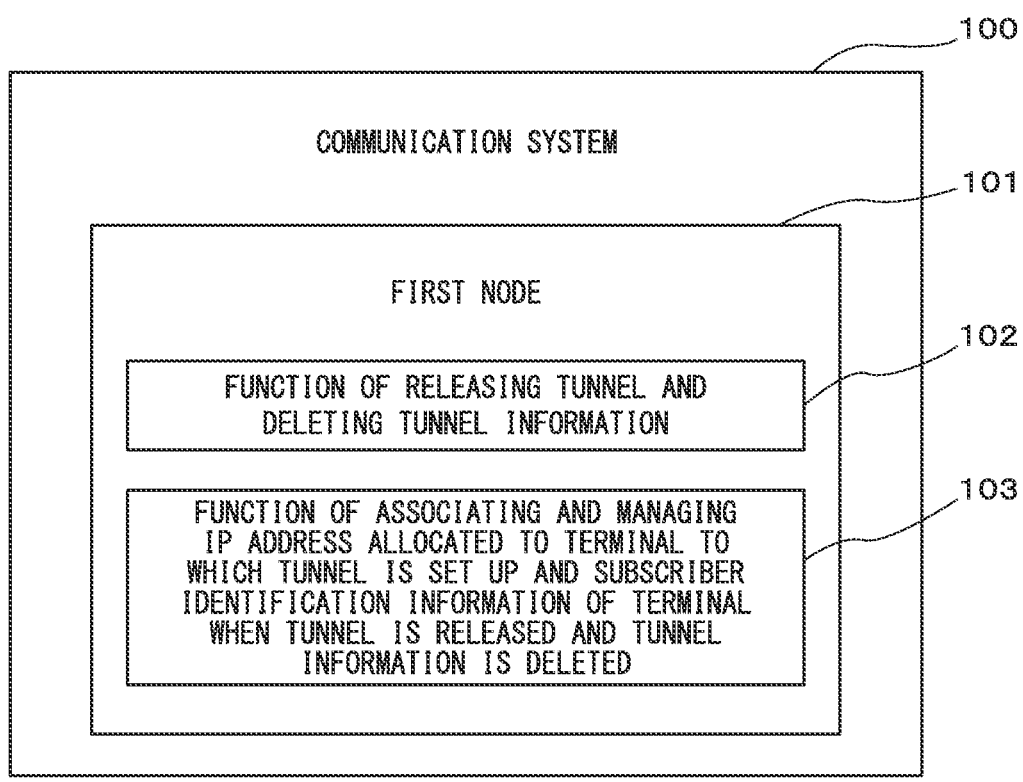
FIG. 6 is a diagram collectively illustrating features of the communication system of FIG. 1.

It is to be noted that features of the above-described exemplary embodiments are collectively illustrated in FIG. 6. That is, a communication system 100 serving as an exemplary embodiment of the present invention (corresponding to the communication system 10 of FIG. 1) is a communication system which provides mobility of packet data using tunneling. In addition, the communication system 100 includes a first node (corresponding to the PGW 6 of FIG. 1) 101 having the following functions. That is, the first node 101 has a function 102 (tunnel control unit) of releasing a tunnel and deleting tunnel information and a function 103 (management unit) of associating and managing an IP address allocated to a terminal (corresponding to the UE 1 of FIG. 1) to which the tunnel is established and subscriber identification information of the terminal when the tunnel is released and the tunnel information is deleted.

It is to be noted that although the case in which each exemplary embodiment described above is applied to the E-UTRAN 8 has been described, each exemplary embodiment described above is also applicable to other mobile networks such as UTRAN and worldwide interoperability for microwave access (WiMAX).

It is to be noted that the exemplary embodiments of the present invention are not limited to the above; for example, the configuration illustrated in FIG. 1 is an example, and a change can be appropriately made to integrate two or more structural elements illustrated in FIG. 1 or to divide one structural element into a plurality of pieces. In addition, a table storing the association information of the UE 1 and the subscriber identification information provided in the PGW 6 can be embedded in a computer apparatus constituting the PGW 6 or the like or can be provided outside the PGW 6 in an integrated manner or in a distributed manner via a communication line or a predetermined interface. In addition, the communication system of the present invention has one or more computers and one or more programs to be executed by the computers as structural elements, and the programs can be distributed via a computer-readable recording medium or the communication line.

In addition, the correspondence between the recitation of the claims and the configurations of the above-described exemplary embodiments is as follows. A "terminal" corresponds to the UE 1. A "first node" corresponds to the PGW 6. A "second node" corresponds to the SGW 5, A "third node" corresponds to the MME 3. A "fourth node" corresponds to the HSS 4.

While the present invention has been described using the exemplary embodiments, the technical scope of the present invention is not limited to the scope disclosed in the above-described exemplary embodiments. It is apparent to one having ordinary skill in the art that various modifications and improvements can be made to the above exemplary embodiments. It is apparent from the recitation of the claims that modes obtained by making the modifications and the improvements can be included in the technical scope of the present invention.

INDUSTRIAL APPLICABILITY

The present invention is applicable to, for example, communication in which mobility of packet data is provided using tunneling. The present invention can release a tunnel while securing mobility without securing resources in an SGW or the like.

DESCRIPTION OF REFERENCE SIGNS

1 UE
2 eNodeB
3 MME
4 HSS

5 SGW
6 PGW
7 PDN
8 E-UTRAN

The invention claimed is:

1. A first node provided in a communication system that provides mobility of packet data using tunneling, the first node comprising:
a tunnel control unit that releases a tunnel and deletes tunnel information;
a management unit that associates and manages an IP address allocated to a terminal to which the tunnel is established and subscriber identification information of the terminal when the tunnel is released and the tunnel information is deleted; and
a reception notification unit that, when there is reception for the terminal after the tunnel established for the terminal is released,
identifies a third node that accommodates the terminal using subscriber identification information associated with an IP address to which a reception packet is addressed, and
transmits a reception notification to the third node.

2. A communication system comprising a first node provided in a communication system that provides mobility of packet data using tunneling, the first node comprising:
a tunnel control unit that releases a tunnel and deletes tunnel information;
a management unit that associates and manages an IP address allocated to a terminal to which the tunnel is established and subscriber identification information of the terminal when the tunnel is released and the tunnel information is deleted; and
a reception notification unit that, when there is reception for the terminal after the tunnel established for the terminal is released,
identifies a third node that accommodates the terminal using subscriber identification information associated with an IP address to which a reception packet is addressed, and
transmits a reception notification to the third node.

3. The communication system according to claim 2, comprising a second node to which the tunnel is established with the first node, wherein the second node releases information about the tunnel and information about the terminal connected to the tunnel when the tunnel is released.

4. The communication system according to claim 3, wherein the second node is selected again every time a recovery process of the tunnel is performed.

5. The communication system according to claim 2, wherein the first node is a node serving as an anchor point that provides mobility of the terminal for a predetermined packet data network.

6. The communication system according to claim 2, comprising the third node, wherein the third node performs a recovery process of the tunnel using the IP address allocated to the terminal before the tunnel is released and information designating the first node when the released tunnel is recovered with transmission from the terminal as a trigger.

7. The communication system according to claim 6, wherein the first node issues the IP address to the terminal using the IP address again that has been notified from the third node and allocated to the terminal before the tunnel is released.

8. The communication system according to claim 6, comprising a fourth node that identifies the third node in which the terminal is accommodated,
wherein the first node performs a recovery process of the tunnel by inquiring the fourth node about the third node that accommodates the terminal when there is reception for the terminal after the tunnel established for the terminal is released.

9. A communication method for providing mobility of packet data using tunneling, the method comprising:
releasing, by a first node in a communication system, a tunnel and deleting tunnel information;
associating and managing, by the first node, an IP address allocated to a terminal to which the tunnel is established and subscriber identification information of the terminal when the tunnel is released and the tunnel information is deleted; and
when there is reception for the terminal after the tunnel established for the terminal is released, identifying, by the first node, a third node that accommodates the terminal using subscriber identification information associated with an IP address to which a reception packet is addressed and transmitting, by the first node, a reception notification to the third node.

10. The communication system according to claim 3, wherein the first node is a node serving as an anchor point that provides mobility of the terminal for a predetermined packet data network.

11. The communication system according to claim 4, wherein the first node is a node serving as an anchor point that provides mobility of the terminal for a predetermined packet data network.

12. The communication system according to claim 3, comprising the third node, wherein the third node performs a recovery process of the tunnel using the IP address allocated to the terminal before the tunnel is released and information designating the first node when the released tunnel is recovered with transmission from the terminal as a trigger.

13. The communication system according to claim 12, wherein the first node issues the IP address to the terminal using the IP address again that has been notified from the third node and allocated to the terminal before the tunnel is released.

14. The communication system according to claim 12, comprising a fourth node that identifies the third node in which the terminal is accommodated,
wherein the first node performs a recovery process of the tunnel by inquiring the fourth node about the third node that accommodates the terminal when there is reception for the terminal after the tunnel established for the terminal is released.

15. The communication system according to claim 4, comprising the third node, wherein the third node performs a recovery process of the tunnel using the IP address allocated to the terminal before the tunnel is released and information designating the first node when the released tunnel is recovered with transmission from the terminal as a trigger.

16. The communication system according to claim 15, wherein the first node issues the IP address to the terminal using the IP address again that has been notified from the third node and allocated to the terminal before the tunnel is released.

17. The communication system according to claim 15, comprising a fourth node that identifies the third node in which the terminal is accommodated,
wherein the first node performs a recovery process of the tunnel by inquiring the fourth node about the third node that accommodates the terminal when there is reception for the terminal after the tunnel established for the terminal is released.

18. The communication system according to claim 5, comprising the third node, wherein the third node performs a recovery process of the tunnel using the IP address allocated to the terminal before the tunnel is released and information designating the first node when the released tunnel is recovered with transmission from the terminal as a trigger.

19. The communication system according to claim 18, wherein the first node issues the IP address to the terminal using the IP address again that has been notified from the third node and allocated to the terminal before the tunnel is released.

20. The communication system according to claim 18, comprising a fourth node that identifies the third node in which the terminal is accommodated,
   wherein the first node performs a recovery process of the tunnel by inquiring the fourth node about the third node that accommodates the terminal when there is reception for the terminal after the tunnel established for the terminal is released.

\* \* \* \* \*